United States Patent [19]
Stanley

[11] 3,861,226
[45] Jan. 21, 1975

[54] LINEAR ACTUATOR

[76] Inventor: Richard B. Stanley, 4 Coventry on Duxbury, Plum Grove Village, Rolling Meadows, Ill. 60008

[22] Filed: Mar. 23, 1973

[21] Appl. No.: 344,198

Related U.S. Application Data

[63] Continuation-in-part of Ser. No. 272,476, July 17, 1972, , which is a continuation-in-part of Ser. No. 148,615, June 1, 1971, abandoned.

[52] U.S. Cl. .................................. 74/89.15, 74/459
[51] Int. Cl. ........................................... F16h 27/02
[58] Field of Search................ 74/89.15, 424.8, 459

[56] References Cited
UNITED STATES PATENTS

| | | | |
|---|---|---|---|
| 3,014,379 | 12/1961 | Wise | 74/459 |
| 3,099,168 | 7/1963 | Martens | 74/459 |
| 3,173,304 | 3/1965 | Strandgren | 74/459 |
| 3,595,094 | 7/1971 | Lemor | 74/459 |

*Primary Examiner*—Wesley S. Ratliff, Jr.
*Attorney, Agent, or Firm*—Beaman & Beaman

[57] ABSTRACT

A linear actuator comprising a shaft member, a tubular member in concentric telescoping relation to the shaft member, and a special bearing unit interposed between the shaft and the tubular member which is characterized by free roller elements encircling the shaft and including right radial flanges and flutes that are arranged to mesh with threading applied to one of the members and apply radial loads against a raceway of the other member, and that are also arranged so that all of them resist thrust loads through their shanks, either at their ends or at a shank groove adjacent their mid portions.

20 Claims, 17 Drawing Figures

Inventor
Richard B. Stanley
By Mann, Brown, McWilliams & Bradway
Attys.

LINEAR ACTUATOR

This invention is a continuation-in-part of my application Ser. No. 272,476, filed July 17, 1972, which is a continuation-in-part of my application Ser. No. 148,615, filed June 1, 1971, now abandoned.

My invention relates to, broadly speaking, a linear actuator, and more particularly, to a device for converting rotary motion to linear motion with high force conversion factors over any desired distance at low speed, and the present application deals with arrangements of the general type described in my U.S. Pat. Nos. 3,572,136 and 3,589,202.

Existing mechanical devices presently in general use for converting rotary motion to linear motion fall into one of three basic groups, namely screw and nut devices which provide reasonable force conversion ratios at low efficiency, ball nut devices which provide high efficiency but with low force conversion ratios, and rack and gear devices which provide low force conversion ratios at low efficiency. So far as I am aware, there was no known mechanism method, prior to my inventions, for converting rotary motion to linear motion with both high force conversion ratios at high efficiency.

Furthermore, while the common solenoid type device provides low force application at high speed for a short distance using electrical energy, so far as I am aware, there is not in use today any practical method of using electrical energy to provide high force and low speed over a comparatively long distance.

Various devices that have been proposed to meet some of these needs have taken the approach of providing threadless shafts and tubular components in telescoping relation, either concentrically or eccentrically, with one of them being rotatably driven, and interposing between them rolling elements that rotate about axes at an angle to the shaft and achieve the desired linear movement by riding on the rotating component. See, for instance, Uhing U.S. Pat. No. 2,940,322, Pravel U.S. Pat. No. 3,046,800 and Hauptman U.S. Pat. No. 3,081,639.

Other devices proposed include a threaded shaft having flanged rollers in meshing relation with the shaft in which the rollers are mounted or are arranged in a manner that limits the radial and thrust loads that can be transmitted therethrough. See, for instance, Antila U.S. Pat. No. 3,244,021, Wahlmark U.S. Pat. No. 2,525,326, and Martins U.S. Pat. No. 3,003,362.

A principal object of my invention is to provide a linear actuator of simplified form that provides high force conversion ratios with high efficiency and low speed for force applications over any desired distance, which is adapted to permit the use of electrical energy as its prime mover.

A further principal object of the invention is to provide a linear actuator in which the purchase that the motion converting components make with respect to the rotary and linearly moving elements increases, up to reasonable limits, as the load increases, making it possible to take full advantage of the force conversion ratios that are available.

Still a further object of the invention is to provide an inexpensive bearing unit that, while being no larger and less complicated that conventional shaft journaling bearing units, forms the heart of the mechanism for utilizing a rotating shaft to move a tube received thereover linearly, or vice versa, and which, by adding duplicates of such unit to the shaft, will provide such output force acting linearly as may be desired.

In accordance with this invention, a linear actuator of wide basic utility is provided by employing a shaft member, a tubular member telescopingly receiving said shaft member, and a special bearing unit interposed between the shaft member and the tubular member, in which one of the members is threaded and the bearing unit comprises a plurality of free rolling roller elements each formed with right radial flanges and flutes proportioned for meshing engagement with the threads of the threaded member, which flanges ride on a raceway of the other member in resisting radial loads. The roller elements are free of any mounting or restraining bearings, have the orientation of their flanges scheduled in accordance with the pitch of the threading and have thrust loads applied to their shanks so that all the rollers take thrust loads and to an extent not heretofore thought possible.

Either member can be the threaded member and either member can be the driving member (to move the other linearly), preferably using a suitable conventional electric motor. The drive is performed through the rolling frictional engagement of the bearing parts involved, which is generated by the resistance encountered, the arrangement being such that the greater the load to be handled, the greater friction there is available to handle it.

In one embodiment of the invention, it is the tubular member that is threaded and the shaft that is driven, and as an example of the possibilities involved, the threading of the tubular member may be pitched in accordance with any desired force conversion factor, such as for instance 300 or 500 to 1, and the tubular member can be of such length, as necessary, to provide linear movement of the tubular member at high force over the desired distance. As only rolling friction is involved in the motion converting bearing unit and its relation to the driving shaft and driven tubular member, efficiency is on the order of 90 percent. The bearing unit involved is no larger than conventional ball bearing units for journaling shafts, and where high force outputs are desired, bearing units are duplicated on the shaft as needed to meet requirements.

Other objects of the invention are to provide a linear actuator type of force transmitting device that operates with efficiencies in the range of 85 to 95 percent, to provide a force transmitting device that provides the above indicated advantages while having one-third the weight and occupying one-third the space of comparable devices, and to provide a linear actuator arrangement and bearing unit therefor that are economical of manufacture, convenient to use, and capable of wide application in industry wherever linear movement of one element with respect to another is desired.

Other objects, uses, and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the Patent Code and that the invention may have other embodiments which are intended to be covered by the appended claims.

GENERAL DESCRIPTION

Figure 1:
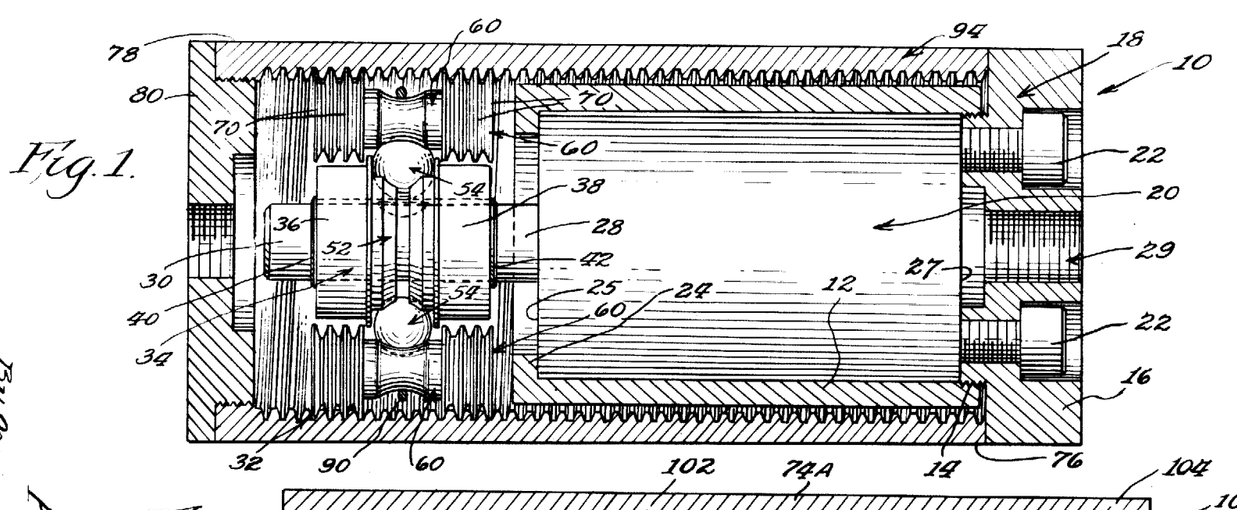
FIG. 1 is a longitudinal sectional view partially in elevation, showing a specific linear actuator device arranged for commercial application and embodying the principles of the present invention.

Reference numeral 10 of FIG. 1 generally indicates a linear actuator device arranged in accordance with the present invention, which is illustrated as a fully constructed embodiment intended for practical application to any situation where one element or component is to be linearly moved with respect to another, as, for instance, opening and closing a door or raising and lowering an automobile window.

The device 10 generally comprises a sleeve 12 having secured thereto as at 14 an end cap 16 to provide a housing 18 for a suitable operating motor 20.

Motor 20 in the form shown is secured in place by suitable bolts 22 applied between the end cap 16 and the motor housing, as well as by having sleeve 12 turned into the end cap 16 as at 14 to dispose the end flange 24 of the sleeve against the motor end 25. Motor end 27 is engaged by end cap 16.

Motor 20 may be of any suitable type capable of reversibly driving a rotatable shaft 28, which shaft 28 is suitably journaled in any conventional manner in motor 20. Motor 20 is suitably connected to a source of power as through opening 29 of end cap 16.

Mounted on the end 30 of shaft 28 is a novel bearing unit 32 arranged in accordance with this invention, which generally comprises an inner race structure 34 in the form of a pair of inner race halves 36 and 38 received over the shaft 28 and between suitable locking rings 40 and 42. The race halves each define the respective extensions 44 and 46 (see FIG. 3) that are recessed as at 48 and 50, respectively, to define a raceway 52 for a plurality of bearing balls 54 that ride on the respective spherically contoured concave surfaces 56 and 58 that define the respective recesses 48 and 50.

Figure 3:
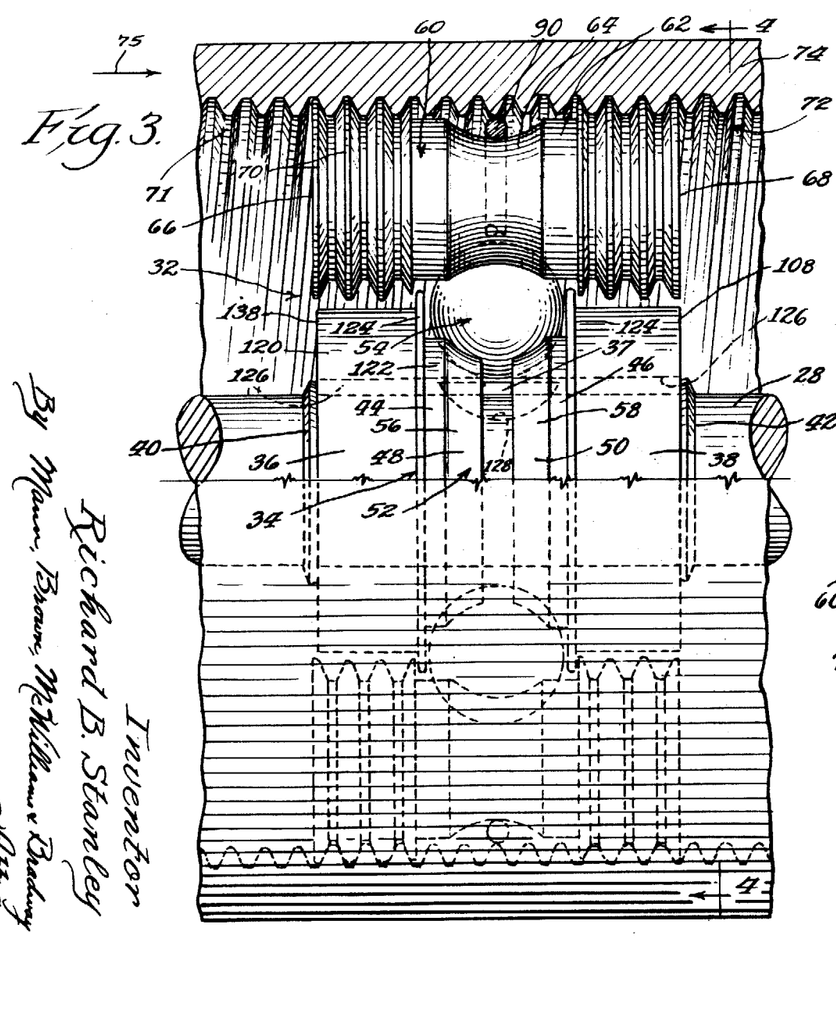
FIG. 3 is a fragmental elevational view, partially in section, and on an enlarged scale, better illustrating the one form of the special bearing assembly or unit that is provided in accordance with this invention.

In accordance with this embodiment of the invention, adjacent bearing balls 54 cooperate with a novel roller element 60, each of which comprises a body or shank portion 62 formed with a spherically contoured encircling concave groove 64 that complements the external configuration of the bearing balls 54, with each end 66 and 68 of the roller element being formed with a number of radial flanges or ridges 70 that are non-helical and right in nature with respect to the longitudinal axis of the roller element, and which are shaped to mesh with internal threading 72 of tubular member 74, that in the embodiment illustrated, forms the linearly moving component of the actuator 10. Each roller element 60 engages two bearing balls 54.

In the embodiment 10, the tubular member 74 has its end 76 (see FIG. 1) open to receive the housing 18 and has its end 78 closed by end cap 80. Tubular member 74 is suitably connected to the other component that is to be moved with respect to the element or component that the end cap 16 is secured to (which may be done in any convenient manner).

Figure 4:
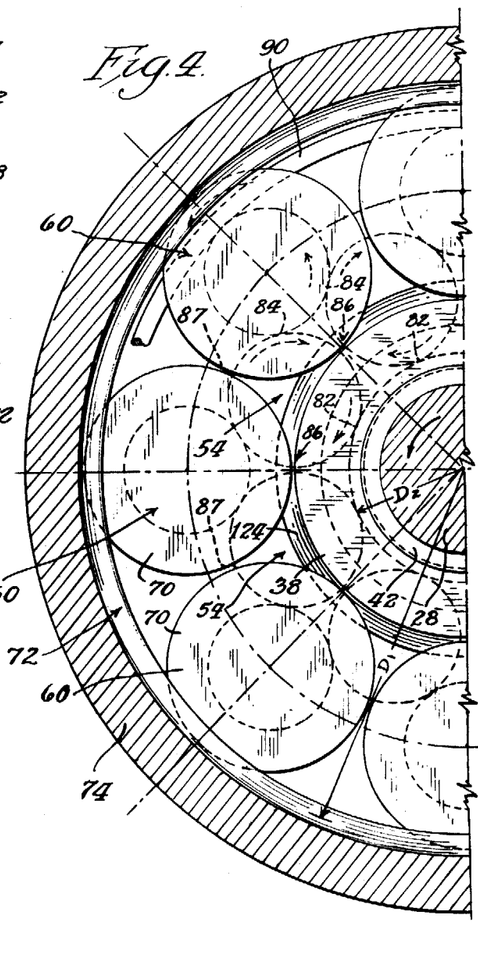
FIG. 4 is a fragmental cross-sectional view taken substantially along line 4—4 of FIG. 3.

As indicated in FIG. 4, the bearing balls 54 engage the inner race structure where indicated at 82, and adjacent balls 54 engage the roller element 60 supported by same at 84. Adjacent bearing balls 54 are spaced apart where indicated at 86, while adjacent roller elements 60 are spaced apart where indicated at 87. This relationship obtains about the circumference of the bearing unit 32.

Either one or both of the locking rings 40 and 42 should be of the compression type, thus tending to, broadly speaking, bias the inner race halves 36 and 38 against the balls 54, which are thereby biased radially outwardly against the respective roller elements 60, which are in turn biased radially outwardly against the threaded inner surface 71 of the tubular member 74. This holds the bearing elements in the operative working relation, maintaining the desired bearing element spacing while avoiding backlash.

Received about the roller elements 60 is a suitable holding ring 90 proportioned so that when roller elements 62 are in operative relation to the tubular member threading 72, the retainer ring 90 will be spaced from the threading 72 and will loosely engage the roller elements 62 that support it so as to not interfere with their desired rotational movement.

The inner race halves 36 and 38 are suitably keyed to the shaft by suitable key 37.

In operation, on energization of motor 20, shaft 28 commences rotation with the inner race structure 34 thus rotating with it. The traction established between the inner race structure 34 and bearing balls 54, and the traction established between bearing balls 54 and the roller elements 60, start their rotation relative to tubular member 74, with the result that the bearing unit 32 rotates relative to tubular member 74 to move the tubular member 74 linearly in the direction dictated by the direction of rotation of the shaft 28. One direction of rotation of the shaft 28 is shown in FIG. 4 with corresponding rotational movements being indicated for the respective bearing balls and roller elements, this moving tubular member 74 to the right of FIGS. 1 and 3 in the case of the threading hand that is indicated in the drawings. Rotation of the shaft 28 in the opposite direction will produce a linear movement of the tubular member 74 in the corresponding opposite direction.

The pitch of the threading 72 defines the pitch and corresponding feed rate of the device 10. As pitch is inversely proportional to the force conversion factors of the unit, in accordance with the applicable laws of mechanics, it will be seen as zero pitch is approached, the force conversion factors approach infinity, making theoretically available large force output capabilities at slow speed where an adequate purchase between shaft 28 and the tubular member 74 can be achieved.

In accordance with this invention, the indicated relationships between the roller elements 60, the balls 54, the raceway 52, and inner race structure 34 as a whole and its locking rings 40 and 42 provide a thrust bearing arrangement which insures that the purchase that the motion converting components make with respect to the shaft and tubular member increases in effectiveness as the loads increase, and that all of the roller elements resist thrust and at the portions of same best suited to do so.

For instance, assuming that a load is acting on the tubular member in a direction 75 (see FIG. 3), and the motor 20 and the parts that it is connected to are held against movement, the force acting in the direction of the arrow 75 is applied to shaft 28 through the shear relation provided by the intermeshing parts of the bearing unit 32 and the lock rings therefor. As loads are increased, friction forces, through which the rotating shaft acts on the bearing balls and rollers (to resist the load) increase. This permits the transfer through the bearing unit 32 to the tubular member 74 the maximum forces made possible by the force conversion factors involved in the particular pitch that is used in the tubular member threading 72 (either to hold the tubular member 74 against movement, or to move same linearly as desired on operation of motor 20), up to the yield strength of the elements involved. Forces acting in the opposite direction provide a similar result.

The pitch of the threading 72 may be made as desired to achieve the force conversion characteristics that are desired. As described in detail hereinafter, the flanges or ridges 70 are scheduled lengthwise of the respective roller shanks in accordance with the pitch of threading 72, and the rollers are free of any journaling bearings, for maximum handling of thrusts and radial loads applied thereto.

With regard to force conversion characteristics, in one specific arrangement of the form of FIGS. 1 - 6, the parts are proportioned so that the diameters marked D1 and D2 in FIG. 4 (which are the internal threading pitch diameter and the diameter of the circle upon which the bearing balls move about the inner race, respectively) have a ratio on the order of 3.2, and providing the threading 72 with a pitch of 0.0625 inch, a linear feed for member 74 of approximately 0.020 inch per revolution of bearing unit 32 is provided, which will achieve an approximate 300 to 1 force conversion factor.

Furthermore, since only rolling friction is involved in the motion and force translating and transmitting parts involved, efficiencies are on the order of 90 percent.

However, by varying the pitch of the internal threading and the two diameters D1 and D2, any desired force conversion factor may be provided, keeping in mind that as the pitch of the tubular member threading decreases, the speed of linear movement will decrease a corresponding amount but the force magnification can be increased up to a threoretical infinity as the pitch is reduced to zero.

Figure 2:
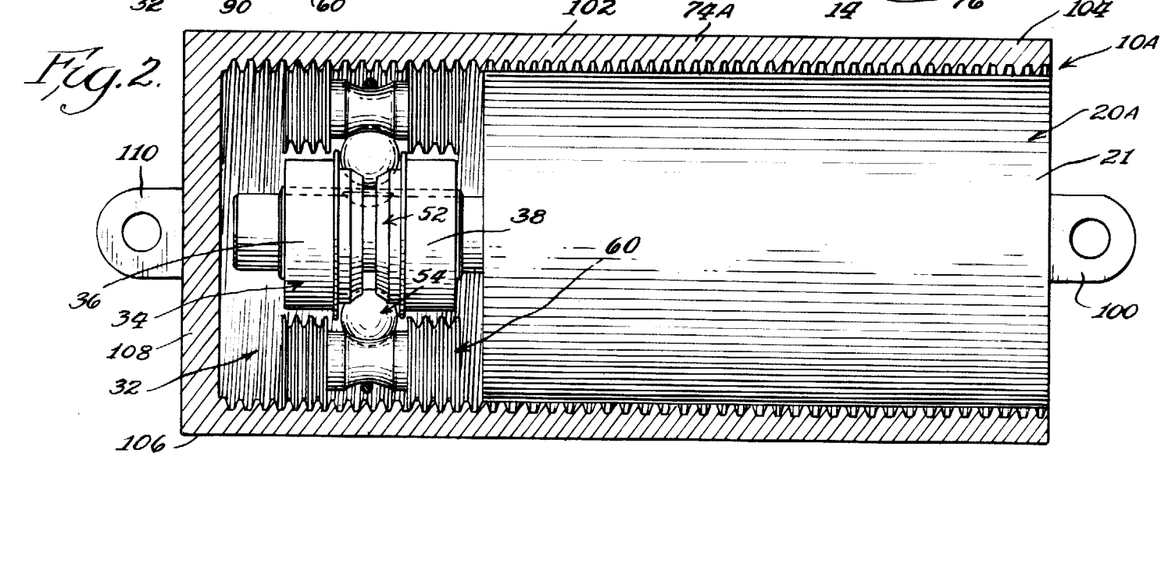
FIG. 2 is similar to FIG. 1 but illustrates a simplified application of the invention.

In the embodiment 10A of FIG. 2, the motor 20A has its housing 21A equipped with a suitable attachment bracket 100 for securement to one of the structures that the actuator 10A is secured between, while tubular member 74A is in the form of an open ended casing 102 having its open end 104 received over the motor casing 21 and its other end 106 closed by wall 108 bearing a suitable attachment bracket 110 for securement to the other component that the device 10A is secured to. Motor 20A, bearing unit 34 and tubular member 74A are otherwise the same as described in connection with the showing of FIGS. 1 and 3 - 6.

From the standpoint of fundamentals, either the shaft or the tubular member may be the rotating member, and the other member will move linearly if restrained from rotational movement. In devices 10 and 10A, the shaft is rotated while in the embodiment 10B of FIG. 7, the tubular member is rotated.

Figures 5, 6, 7:
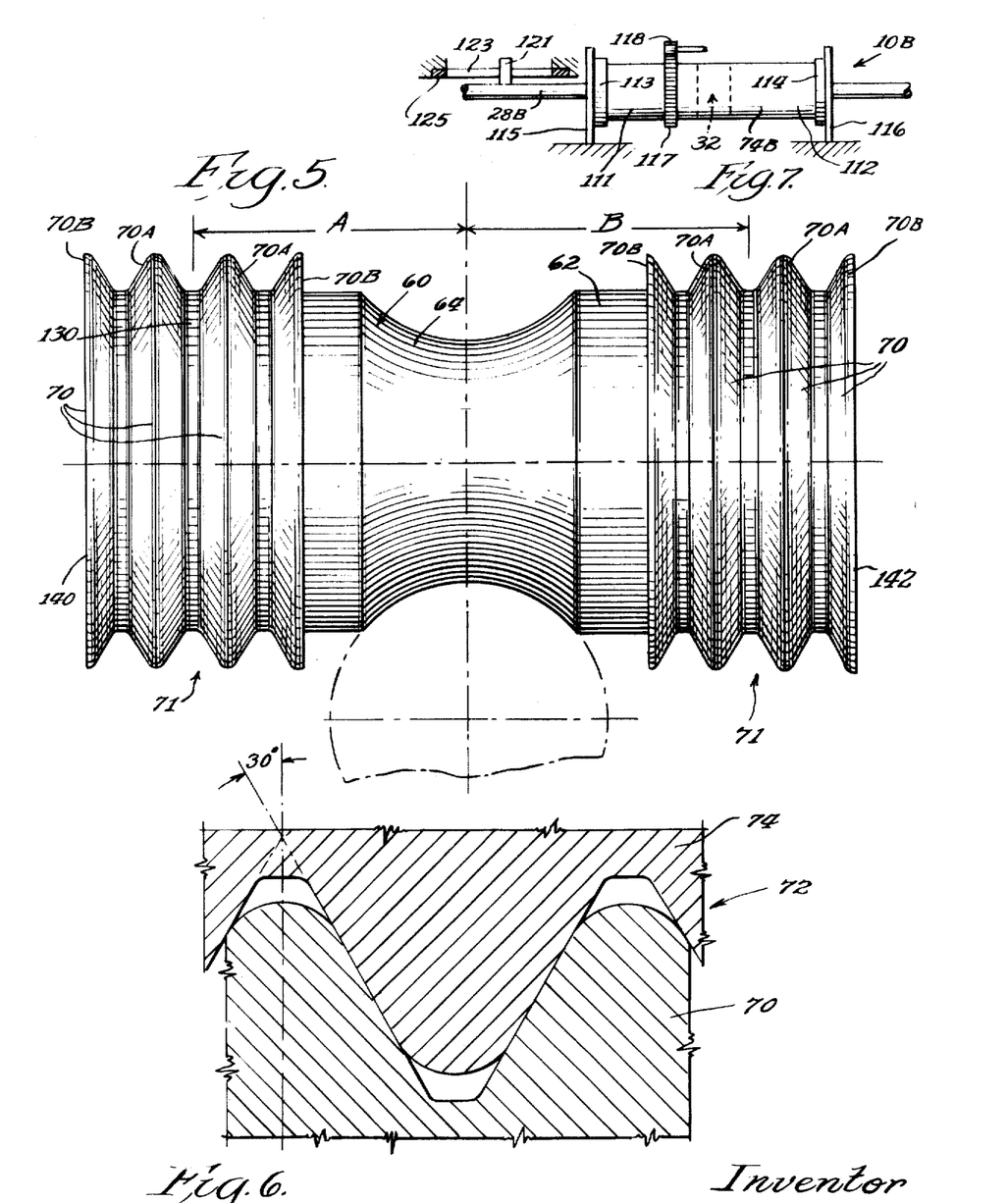
FIG. 5 is an enlarged view of a novel roller element forming an important part of my invention and indicating in phantom how it cooperates with an adjacent ball bearing.
FIG. 6 is a fragmental cross-sectional view, on a greatly enlarged scale, illustrating the manner in which the flanges or ridges of the roller of FIG. 5 cooperate with the internal threading of the device tubular member as part of the motion and force transmitting features of this invention.
FIG. 7 is a small scale view diagrammatically illustrating a modified form of the invention.

In the embodiment 10B of FIG. 7, tubular member 74B is journaled at its ends 111 and 112 in suitable support bearings 113 and 114 suitably mounted in fixed supports 115 and 116, respectively. Tubular member 74B has ring gear 117 fixed thereto driven by pinion 118 actuated by a suitable reversibly driven motor (not shown). Tubular member 74B is threaded in the same manner as tubular member 74 and is equipped with a bearing unit 32 cooperating with shaft 28B extending through tubular member 74B and suitably attached to the element or apparatus that is to be moved linearly. Shaft 28B is retrained from rotation by member 121 fixed to the shaft 28B and riding in guide slot 123 formed in stationary plate 125, and moves linearly on rotation of tubular member 74B.

Figures 8, 9, 10:
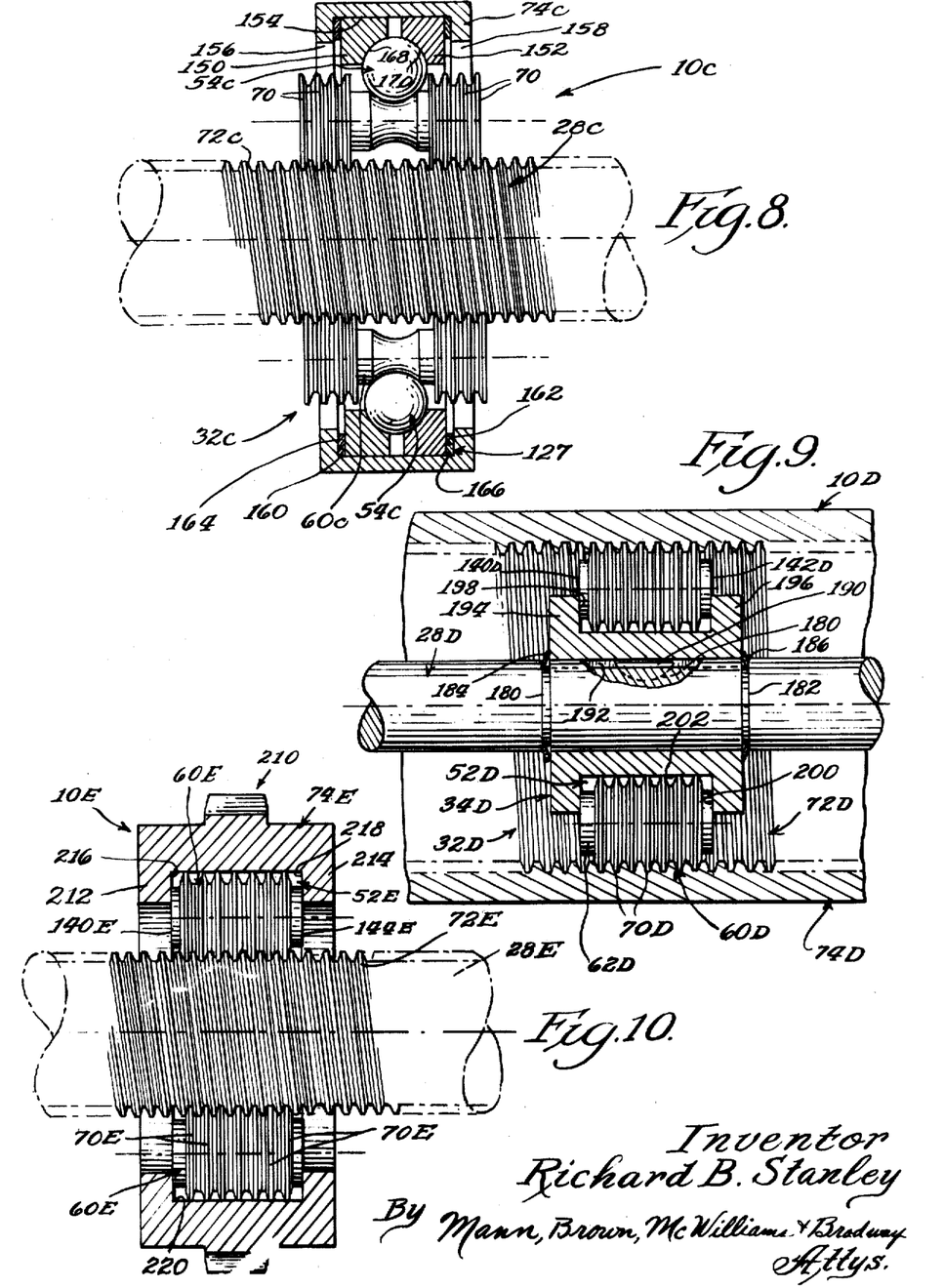
FIGS. 8 – 10 are views similar to that of FIG. 3 illustrating alternate forms of the invention.

In the embodiment 10C of FIG. 8, it is the shaft 28C that is threaded as at 72C, roller elements 60C of bearing unit 32C being in meshing relation with the shaft and bearing balls 54C riding on outer race structure mounted in tubular member 74C. Either member 28C or 74C may be rotated to provide linear movement of the other member.

FIGS. 9 and 10 illlustrate simplified embodiments of the invention in which the bearing balls are eliminated. In device 10D of FIG. 9, rotating shaft 28C has keyed thereto inner race structure 34D defining raceway 52D about which roller elements 60D are applied in meshing relation with the threading 72D of tubular member 74D that moves linearly on rotation of shaft 28D. In device 10E of FIG. 10, the shaft 28E is to move linearly on rotation of tubular member 74E through the purchase provided by roller elements 60E riding in raceway 52E and meshing with threading 72E of the shaft; while some sliding friction is involved in the simplified embodiments of FIGS. 9 and 10, efficiency is still on the order of 85 percent.

Figure 11:
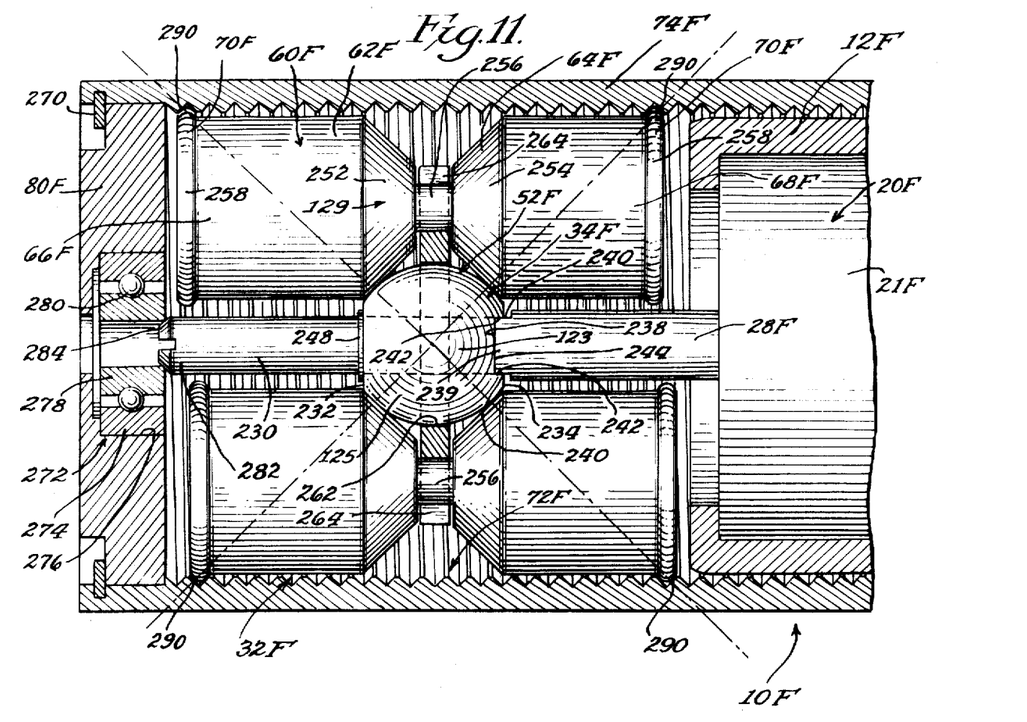
FIG. 11 is a view similar to that of FIG. 1, but illustrating a further embodiment of the invention.
Figure 12:
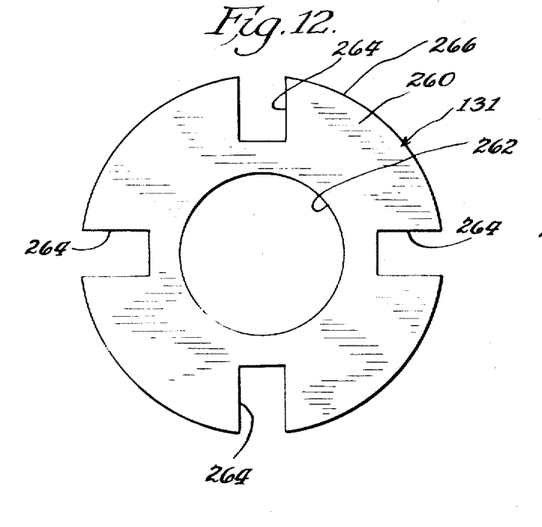
FIGS. 12 and 13 are plan views of several of the component parts of the embodiment of FIG. 11.
Figure 13:
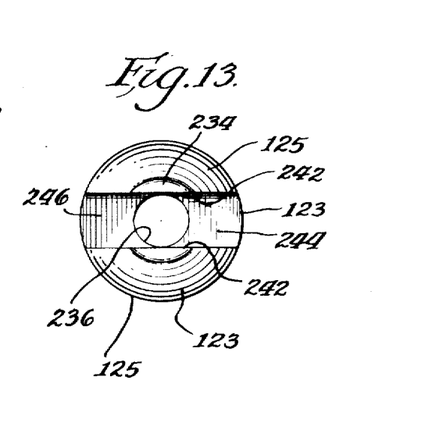

In the embodiment 10F of FIGS. 11 – 13, the shaft 28F of motor 20F is equipped with a ball element 123 that forms the inner race structure 34F of the embodiment 10F. Ball element 123 is formed to define spherically contoured peripheral surface 125 that defines raceway 52F about which roller elements 60F ride. The shanks 62F of the roller element 60F define the respective grooves 64F encircling same, with the respective grooves 64F defining groove portions 129 of the respective roller elements 60F which ride on the raceway 34F.

Each roller element 60F and its respective ends 66F and 68F is formed with a single radial flange or ridge 70A that is non-helical and right in nature with respect to the longitudinal axis of the respective elements, and which respectively mesh with the internal threading 72F of tubular member 74F that in the embodiment 10F, forms the linearly moving component of the actuator. Threading 72F preferably comprises V threading of 5 degree angulation.

Roller elements 60F in the form shown are four in number, and are held in spaced apart relation by retainer 131 (see FIG. 12).

Figure 14:
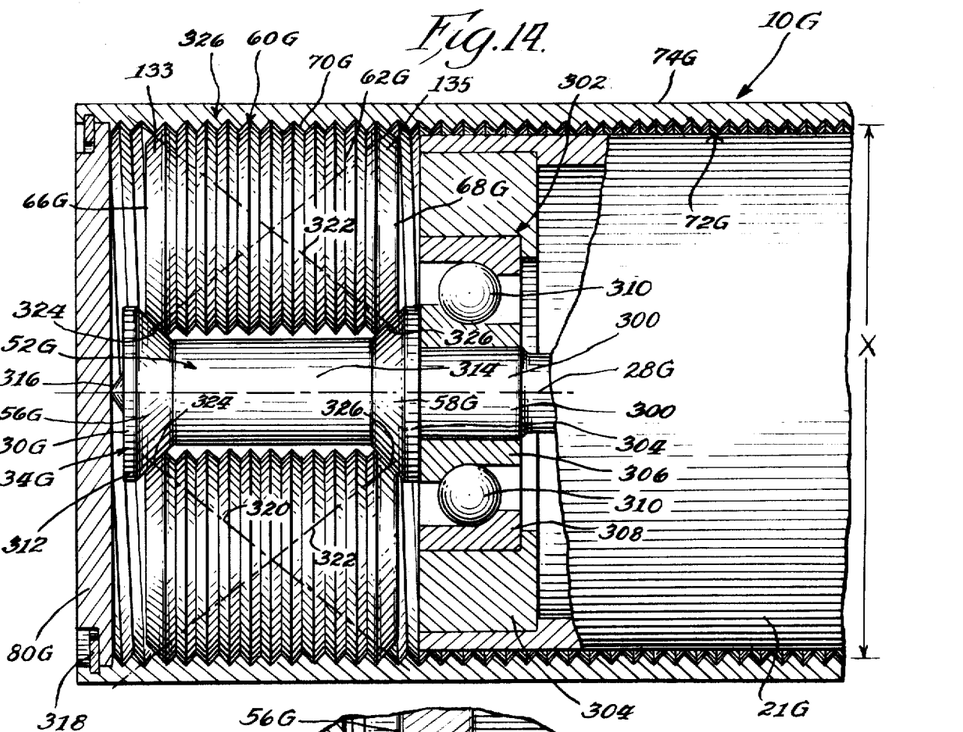
FIG. 14 is a view similar to that of FIG. 1, but illustrating a further embodiment of the invention.
Figure 15:
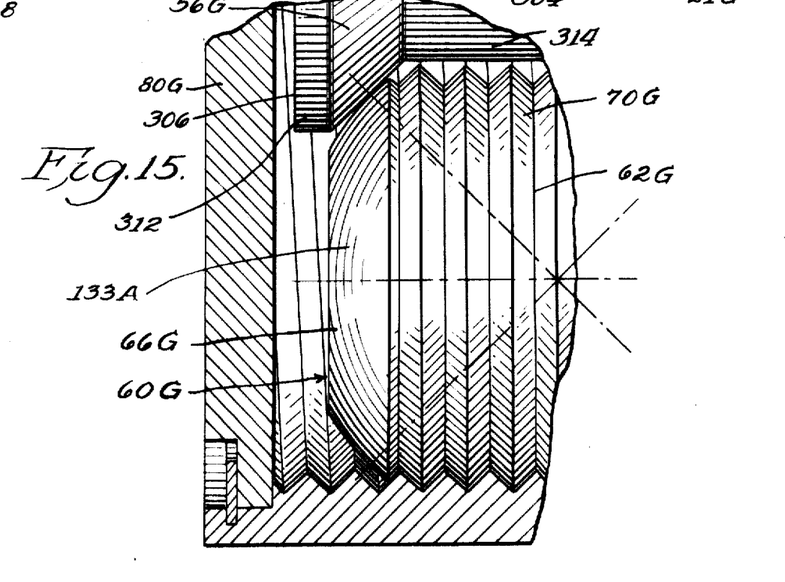
FIG. 15 is a fragmental view on an enlarged scale and illustrating the relation between the driving shaft and rollers at one end of the roller, and also showing a modification in the embodiment of FIG. 11.

In the embodiment 10G of FIGS. 14 and 15, the shaft 28G of motor 20G includes inner race structure 34G that defines a raceway 52G for roller elements 60G which includes opposed thrust resisting surfaces 56G and 58G that are respectively engaged by the respective rolling surfaces 133 and 135 of the roller elements 60G. Each of the roller elements 60G intermediate the respective rolling surfaces 133 and 135 that are adjacent the respective ends 66G and 68G of the respective roller elements is formed with a plurality of flanges or ridges 70G that are non-helical and right in nature with respect to the longitudinal axis of the respective roller elements 60G, and which respectively mesh with the internal threading 72G of tubular member 74G that, in the embodiment 60G, forms the linearly moving component of the actuator 10G. Threading 72G preferably comprises V-threading of 45° angulation and flanges 70G are contoured in a manner complementary thereto.

The roller elements 60G in the form of actuator 10G that is illustrated, are four in number and are in spaced relation about the axis of shaft 28G (although only two are shown to facilitate illustration). In this embodiment of the invention, no roller spacing device or retainer is used or required as the meshing of the individual roller elements with the threading 72G, and the pitch of the threading and the association of the roller element roller surfaces 133 and 135 with the respective thrust resisting surfaces 56G andd 58G, maintains the roller elements 60G in the desired spaced relation.

Figure 16:
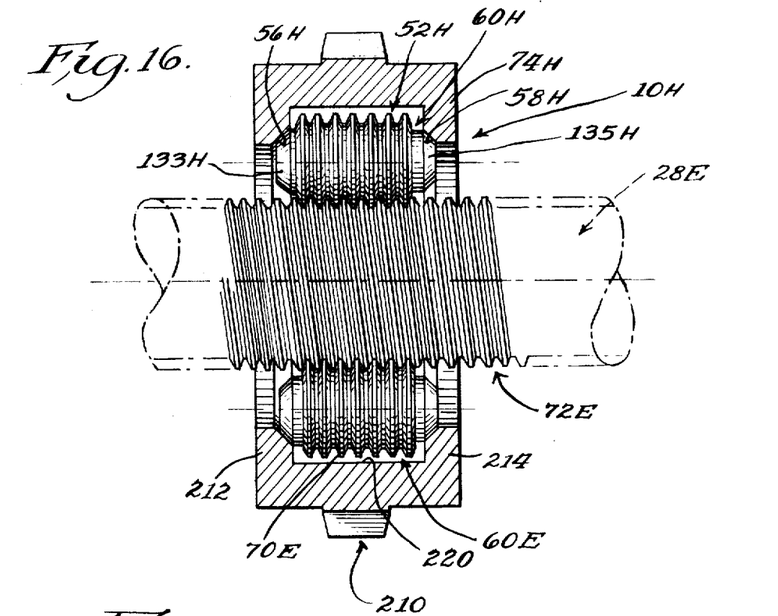
FIG. 16 is a view similar to that of FIG. 10 but illustrating a modification in the embodiment of FIG. 10.

The actuator 10H of FIG. 16 is similar to the embodiment of FIG. 10 except that the roller elements 60H are formed with rolling surfaces 133H and 135H, respectively, that respectively ride on thrust resisting surfaces 56H and 58H that are formed in tubular member 74H. Roller elements 60G mesh with threading 72E of shaft 28E that moves linearly on rotation of the tubular member 74H.

Figure 17:
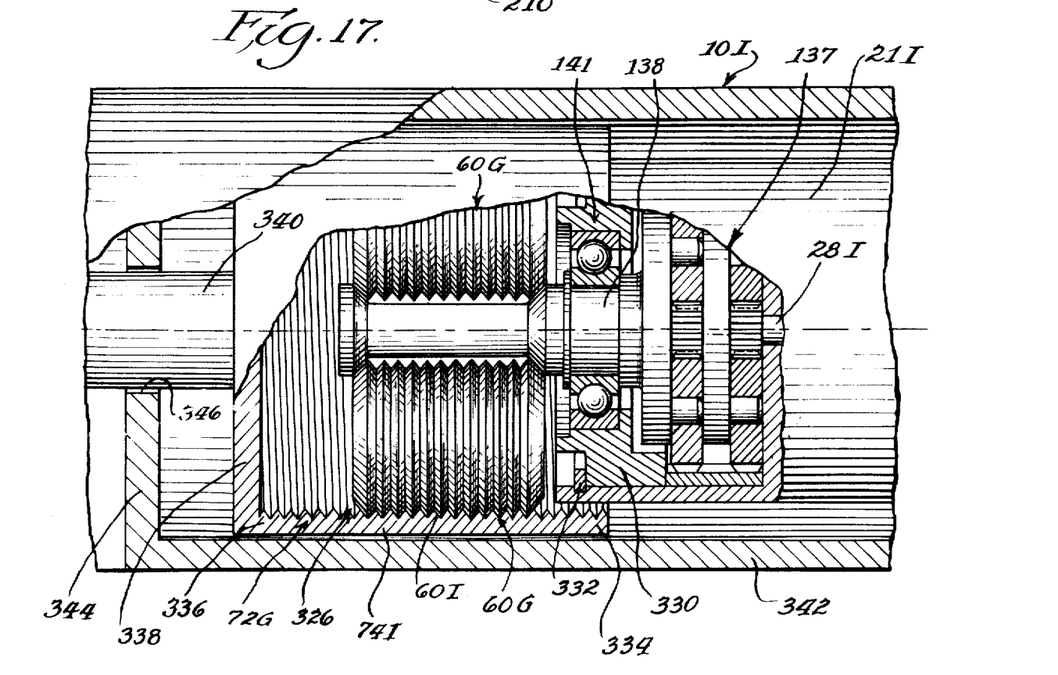
FIG. 17 is a view similar to that of FIG. 14, showing the embodiment of FIG. 14 in combination with a gear reducer.

In the actuator 10I of FIG. 17, a gear reducer 137 is interposed between the motor driven shaft 28I and shaft segment 138 that is journaled in bearing structure 141, which shaft segment 138 and associated roller elements 60I are arranged in the manner indicated in FIG. 14 for moving linearly tubular member 74I.

SPECIFIC DESCRIPTION

In all embodiments, the driving motor may be of any suitable reversibly drivable type. In the embodiment 10, the specific nature of the components forming motor housing 18 as well as those forming tubular member 74 may likewise be of any suitable type, and the specifics employed will depend on the application to which the invention is put. It is essential, of course, that the tubular member 74 have its internal surface 71 formed with threading 72 to the extent of the length of travel desired for a particular arrangement. Threading 72 may be of any suitable type, that illustrated being the standard V-type threading.

The inner race structure 34 is preferably formed from a suitable bearing steel, suitably hardened and ground to the shaping shown. In the form illustrated, the inner race halves 36 and 38 are identical in configuration but used in reverse opposed positioning, and comprise an annular body 120 each including an axially extending end portion 122 that forms the respective extensions 44 and 46. Each body 120 includes a radial flange 124 which is proportioned to project between the two sets of right radial flanges or ridges 70 that are carried by each roller element 60, as indicated in FIGS. 1 and 3, to serve as a means to avoid inadvertent displacement of the roller elements longitudinally of the axis of the inner race after the bearing unit 32 is assembled but prior to application of same to a shaft 28. When the bearing unit 32 is in its operating position, flanges 124 are spaced from the roller element flanges 70, as indicated in FIG. 3.

The inner race bodies 120 are each formed with a suitable keyway 126 adapted to receive the key 37 that is lodged in suitable slot 128 formed in shaft 28.

The bodies 120 forming inner race structure 32 may be conveniently made from a single one piece member and then separated at the ends of extensions 44 and 46 by a slot having the proportioning indicated in FIG. 3 relative to the bearing balls.

Retainer rings 40 and 42 may be of any simple lock ring type, those shown being of the compression spring type for the purpose of applying a bias to the respective raceway halves to bias them against the bearing balls 54. Only one of the lock rings need be of this type, however, as the other lock ring could alternatively be a simple stop type lock ring.

Bearing balls 54 may be of any conventional bearing ball type.

The roller elements 64 are preferably formed from a suitable bearing steel and are suitably hardened and ground to the shape indicated. In the embodiment illustrated, as the tubular member threading 72 is of the standard V-type, the radial flanges or ridges 70 are proportioned as indicated in FIG. 6 to complement the shaping of the threading 72 transversely of the shaft axis. The flanges 70 of each roller element in the form shown comprise a group 71 at each end of the roller element with the flanges of each group consisting of two whole flanges 70A and two half flanges 70B. However, the specific flanging employed in terms of numbers of flanges may be varied to meet specific design requirements.

As already indicated, the ridges or flanges 70 of roller elements 60 are not helically contoured, but rather are right or planar in configuration transversely of the respective roller elements 62. However, to insure that all the roller elements 60 are operative in resisting thrust loads, the groups 71 of ridges or flanges 70, of the respective roller elements 62, are located at different locations along the longitudinal axis of the respective roller elements, depending on the circumferential location of a particular roller element 62 in bearing unit 32 to accommodate the lead of the threading 72. In this connection, it is to be noted that the bearing balls 54 and raceway 52 are coplanar transversely of the shaft, which requires that the grooves 64 of the roller elements 60 also be coplanar of the shaft. Thus, the dimensions A and B between the longitudinal center of each roller element and the center recess 130 defined by each set or group 71 of flanges 70 of the respective roller elements 60 will vary with the positioning of the respective roller elements 62 about the circumference of the shaft. For instance, the dimensions A and B for the roller element 60 shown in FIG. 5, which is the upper roller element shown in FIG. 3, are equal; however, the dimensions A and B for the roller element 60 to be located just behind the upper roller element of FIG. 3 (not shown) will be unequal, dimension A exceeding dimension B as required for flanges 70 of this particular roller to fit into (or mesh with) threading 72 with its groove 64 in coplanar relation with the desired location of the bearing balls 54. The remaining elements are formed to the same end, with some of the roller elements turned end for end in their positioning in the bearing unit so that the elements 60 as a whole are more or less centered over the race structure 34 with inner race flanges disposed between but spaced somewhat from the flange groups 71 of each roller element 60. Elements 60 at their ends define planar end surfaces 140 and 142.

The material from which the motor shaft 28 and tubular member 74 are formed should be appropriate for the loads to be applied to the device.

Retainer ring 90 may be of any suitable type, such as the common wire retainer ring of the type with its ends split for smooth overlapping.

In one specific embodiment of the invention, the shaft 28 has a diameter of five-sixteenths inch and the tubular member 74 has an external diameter of five-eighths inches. The internal diameter of the raceway halves 36 is 0.315 inch, with the race structure having a dimension of approximately eleven-sixteenths inch axially of the shaft between its ends 136 and 138. Bearing balls 54 and one-fourth inch in diameter with race ring surfaces 48 and 50 and roller element grooves 64 being complementarily formed with respect thereto.

Roller elements 64 are eleven-sixteenths inch in length and have a 0.3037 shank diameter with radial flanges 70 having a maximum diameter of 0.3749 and a pitch diameter (relative to threading 72) of 0.3437 inch.

The threaading 72 has a pitch of 0.0625 inch, which is the spacing between the ridges or flanges 70 of each group 71 must have (between their mid portions). D1 is 1.375 inch while D2 is 0.4284 inch.

There are eight bearing balls 54 and eight roller elements 60 with the dimension A of the roller elements being as follows (with respect to the roller element positioning sequence about bearing unit 32): Dimension A for one element 60 (that shown in FIG. 5) will be 0.2500 inch for roller member one, the same dimension for two of the rollers will be 0.2578 inch (which will be roller members two and eight, numbering clockwise of FIG. 4), two further rollers will have this dimensions as 0.2656 (which will be rollers three and seven), another two rollers will have this dimension as 0.2734 (which will be rollers four and six), and the remaining roller (number five) will have this dimension at 0.2812. The ridges or flanges at the other end of each roller element 60 shift in the same direction accordingly, with respect to the roller element groove 64, and thus the dimension B lessens the same amount dimension A increases for any particular roller element, depending on the roller spacing from initial roller.

The result is a small compact bearing unit which may be assembled in one hand and wire retainer ring 90 applied over same to hold the parts in assembled relation as the bearing unit is applied to the shaft 28. Roller elements one through five are applied in sequence about the bearing unit while roller elements six through eight are turned end for end before applying in the indicated sequence. As the flanges 70 of the flange groups 71 are on either side of each roller element groove 62, the roller elements when applied to the tubular member 74 are held against swinging movement about the bearing balls acting as pivots.

The bearing unit 32 in mass production is economical to manufacture, and may readily be assembled in units retained together by retainer ring 94 for storage until needed.

The embodiments of FIGS. 8, 9 and 10 are illustrated in a largely diagrammatic manner and are provided to indicate several of the varient forms of the invention that may be employed to provide linear movement utilizing a rotary driving prime mover.

In the embodiment 10C (see FIG. 8), shaft 28C is assumed to be suitably driven by a suitable reversibly driven electric motor (not shown) to move tubular member 74C linearly, tubular member 74C being suitably connected to the tool or other implement (not shown) that is to be moved linearly. Outer race structure 127 comprises spaced race elements 150 and 152 seated in the annular raceway seat 154 that is defined by tubular member 74C, the latter being flanged as indicated at 156 and 158 to provide spring seats 160 and 162 for compression type lock rings 164 and 166 that may be of the same general character as lock rings 150 and 152 against bearing balls 54C. Race rings 150 and 152 are formed with the respective annular raceway surfaces 168 and 170 along which the bearing balls 54C ride.

The roller elements 60C may be the same as roller elements 60, and define the flutes or flanges 70 that are in meshing relation with the threading 72C of shaft 28C. As already indicated, either member 28C or 74C may be the driving member.

In the embodiment 10D of FIG. 9, the shaft 28D is rotated in any suitable manner and is recessed as at 180 and 182 to receive the respective compression type locking rings 184 and 186 that may be the same type as lock rings 40 and 42 of FIGS. 1 –6. Shaft 28C is also suitably slotted as at 188 to receive suitable key 190 that keys inner race structure 34D to shaft 28C. Inner race structure 34D is slotted as at 192 to receive the key 190, and includes end flanges 194 and 196 that respectively define guide surfaces 198 and 200 against which the respective roller element end surfaces 140D and 142D engage when forces acting longitudinally of members 28D and 74D are to be transmitted through device 10D.

Roller elements 60D are formed to define right flanges or ridges 70D in spaced relation along their respective shanks 62D that have configurations complementing the tubular member threading 72D for intermeshing relation therein. Roller elements of bearing unit 32D are arranged about raceway 52D with sufficient roller elements 60D being provided so that adjacent roller elements are in contact, and with flanges or ridges 70D riding on the cylindrical raceway surface 202 against which they are biased by the action of threading 72D on their flanges 70D.

Device 10D may be incorporated in a linear movement unit of the general type shown in FIGS. 1 and 2 for practical application and either of members 28D or 74D may be the driving member.

The device 10E contemplates that shaft 28E will be arranged in a manner similar to the way shaft 28B of FIG. 7 is arranged, with tubular member 74E being provided with a suitable ring gear structure 210 thereabout meshing with a suitable driving pinion (not shown) that may be rotated in any suitable manner. Tubular manner 74E is flanged as at 212 and 214 to define guide surfaces 216 and 218, respectively, against which roller element end surfaces 140E and 142E, respectively, engage when loads are transmitted through unit 10. Roller elements 60E may be the same as roller element 60D, they arranged about the raceway 52 with their ridges or flanges 70E in the meshing relation with the threading 72E that is indicated, with sufficient rollers 60E being provided so that adjacent roller elements are in engagement. Ridges or flanges 70E ride on the cylindrical raceway surfaces 220 against which they are biased by the action of threading 72E on flanges 70E.

As previously suggested, the flanges or ridges 70D and 70E of the respective roller elements 60D and 60E are spaced longitudinally of the respective roller elements to accommodate the pitch of threading 72D and 72E, respectively. Thus, the flanges or ridges of adjacent roller elements will be displaced axially of the roller elements in the manner already described with reference to the device 10. In the embodiments of FIGS. 9 and 10 the roller element ridges or flanges also ride in the bearing raceway that is provided.

Referring now the linear actuator 10F, motor 20F and its housing 21F may be substantially the same as that described in connection with the device 10, and sleeve 12F is the same as sleeve 12, with tubular member 74F being the same as tubular member 74 except that threading 72F is preferably 45° angle threading as this has been found to be the best angle for the rolling action and force transmitting action involved.

The shaft 28F is supported in housing 21F in any suitable thrust resistant manner (as it is in all the illustrated embodiments of the invention) and includes an extension portion 230 of reduced diameter over which ball element 123 is received.

Ball element 123 is formed from suitable bearing steel, suitably hardened and ground to the shape being shown, and is essentially a sphere that is truncated at opposite portions of same to define flattened ends 232 and 234. Ball element 123 defines bore 236 having a diameter that substantially complements the outer diameter of shaft extension 230. Shaft extension 230 merges into the shaft 28F proper as at shoulder 238, with opposed side portions of shaft 28F being excised to define planar abutment surfaces 240 in the area of shoulder 238 for close fitting and keying cooperation with the corresponding shaped sides 242 of groove 244 that is formed in ball element 123 normally of the bore 236 for keying the ball element to the shaft 28.

The ball element 123 is held against shoulder 238, which is formed into a pair of diametrically opposed shoulder portions 239 (only one of which is shown in FIG. 11), by suitable lock ring 248 applied against flattened end 232 of the ball element and received in a suitable recess 250 formed in shaft extension 230. Shoulder portions 239 seat against the bottom wall 246 of ball element groove 244.

Roller elements 60F are preferably formed from a suitable bearing steel, and are suitably hardened and ground to the shape indicated, which includes the roller element shanks 62F being formed to define the opposed frusto conical surfaces 252 and 254, and neck 256 of reduced section, that define the roller element groove 64F and groove portion 129. It is the surface 252 and 254 which are in rolling engagement with the peripheral surface 125 of ball element 123 which forms the raceway 52F. The ridges or flanges 70F have rounded rims 258 which are in rolling engagement with the threading 72F.

Retainer 131 is in the form of disc member 260 formed to define a bore 262 that freely receives the ball element 123 without contact therewith (see FIG. 11), and also formed with a radial slot 264 leading radially inwardly of its peripheral surface 266, for each roller element 60F that is employed. In the form shown in the drawings, four roller elements 60F are employed, two being omitted in the showing of FIG. 11 to simplify the illustration.

The slots 264 are proportioned to freely receive the necks 256 of the respective roller elements, and since the roller elements tend to position themselves in parallelism with the angle of the threading, the slots 264 may be angled accordingly. As the threading 72F is assumed to have the same pitch as threading 72 (0.0625 inch), this angulation will be on the order of 1° out of parallelism with the axis of shaft 28F, and consequently the small angulation involved is not shown in the drawings.

In the form shown, the cap 80F is retained in place by locking ring 270 and mounts roller bearing unit 272, which includes outer race 274 suitably fixed within recess 276 of the end cap 80F, an inner race 278, and bearing balls 280 interposed in the usual ball bearing manner between the inner and outer races 274 and 278 (suitable ball spacers and seals for bearing unit 272 may be conventionally employed but are omitted to simplify the drawing). The end 282 of shaft extension 230 is formed with frusto conical stop surface 284 which engages the inner race 278 to define the limit of movement of the tubular member F to the right of motor 20F. This avoids interfering with the freedom of rotation of shaft 28F.

It has been found that by having the flanges 70F of the respective roller elements 60F spaced apart a distance that is at least as great as the pitch diameter of the threading 72F, any tendency of the rollers to tip under load, whereby their ends tend to move in opposite directions inwardly and outwardly of the longitudinal axis of the device 10F, is avoided together with the binding action that may result.

The universal joint like relation provided by the engagement of the roller portions 129 and the peripheral surface 125 of ball element 123 permits the roller elements 60F to swivel as necessary to adapt themselves to the angulation of the threading 72. The angulation of the respective rollers relative to the axis of shaft 28F will increase as the pitch of the threading 72 increases. Thus, the same bearing unit 32F may be applied to tubular members 74F having a different pitch, with the different pitch being accommodated by the swiveling action that has been indicated.

In the embodiment 10F, the lines of contact 290 that the flanges 70F of the respective rollers make with the threading 72F lie approximately on 45° angle lines 292 that approximately intersect at the radial center of ball element 123. The respective lines 292 are perpendicular with the axial outer threaded surface engaged by the respective roller element ridges or flanges 70F.

The ridges or flanges 70F alternately could be of the same V section configuration that is shown in the embodiments of FIGS. 1 – 11.

The 45° threading 72 not only gives the best angle for the rolling action of the roller elements that is involved, but also divides linear forces acting through the device into two equal resultants, one acting against the tube and the other acting against ball element 123.

In the linear actuator 10G of FIGS. 14 and 15, the motor shaft 28G extends from housing 21G and includes journal portion 300 which is suitably journaled by suitable thrust bearing 302 in an end wall 304 that is suitably fixed with respect to the housing 21G. The shaft 28G is flanged as at 304 to seat against the inner race 306 of thrust bearing 302, the outer race 308 of thrust bearing 302 being suitably seated in end wall 304 and being spaced from the inner race 306 by suitable bearing balls 310 that are interposed between inner and outer races in a suitable and customary thrust bearing manner that will be obvious to those skilled in the art.

The shaft 28G at its end 30G is flanged as at 312, with the raceway 52G being formed between the flanges 304 and 312. As already indicated, the raceway 52G is defined by thrust resisting surfaces 56G and 58G which in the form of FIG. 14 are of frusto-conical nature, and which converge in the direction of cylindrical shaft surface 314 that separates the surfaces 56G and 58G. Shaft end 30G includes a conical end portion 316 that serves as a stop against which end wall 80G of tubular member 74G engages to define one end of the path of movement of the tubular member 74G with respect to housing 21G and its associated shaft 28G (as shown in FIG. 14). In the form shown, end wall 80G is secured in place by a suitable lock ring 318.

Tubular member 74G may be the same as tubular member 74F, with the threading 72G preferably being 45° angle V-type threading that has been found by the applicant to be the best angle for the rolling action and force transmission action involved in accordance with this invention.

The roller elements 60G of bearing unit 32G are preferably formed from a suitable bearing steel and are suitably hardened and ground to the shape indicated, which includes the roller element shanks 62G being formed to define the roller element ends 66G and 68G, the rolling surfaces 133, 135, which are of a frusto-conical configuration complementing that of the respective thrust resisting surfaces 56G and 58G, and the flutes 72G. Flanges 72G are formed on the respective roller shanks 62G and are shaped to complement the pitch of the threading 72 in accordance with the location of the respective rollers 60G about the axis of the shaft 28G, in accordance with the location of the roller flanges that is described relative to the actuator 10. The flutes or flanges 70G are proportioned to avoid engagement with cylindrical surface 314 of shaft 328.

The rolling surfaces 133 and 135 may be spherically contoured, as indicated for surface 133A of FIG. 15. Surfaces 56G and 58G may be similarly contoured if so desired.

The rollers 60G should have a length at least equal to that in which the diagonal lines 320 and 322 of each such roller element, that extent between the areas of engagement 324 and 326 with respective surfaces 56G and 58G, and the diagonally opposite sides of the respective rollers (in a plane that includes the axis of rotation of the respective rollers and the axis of rotation of the shaft 28G), intersect at 90° angles approximately at the axial center of the respective roller elements, and also intersect at 45° angles with the threading 72G, as represented by the cylinder of revolution that is formed by a generatrix lying along the pitch diameter of the threading 72G (which diameter is represented by the dimension X of FIG. 14).

While roller elements 60G can exceed such minimum length, they should not be under such minimum length to avoid tendencies to tip about their longitudinal centers under load.

The embodiment of FIGS. 14 and 15 permits the roller elements 60G to be on the order of half the length of the roller elements of actuator 10F, this further minimizing the working size of the device. As the flanges or flanges 60G are in the same spacing as, and are in number corresponding to the threads of threading 72G between the rolling surface 133 and 135, additional thrust capacity is provided that greatly improves the force conversion capability.

As already indicated, no retainer or spacer device is employed in actuator 10G to keep the roller elements 60G spaced from each other. The engagement of the roller element flanges with the threading 72G and the engagement of the rolling surfaces 133 and 135 with the thrust resisting surfaces 56G and 58G, respectively, together with the pitch of the threading 72, and the programming of the roller flanges relative to their shanks, keeps the rollers in their desired spaced relation.

As is true with any of the embodiments of the invention disclosed herein, the threading 72G may be any pitch or helix angle that is desired.

With regard to the embodiment 10H, it is similar in many respects to the actuator 10E except for the provision of the cooperating frusto-conical surfaces 133H and 135H on the roller elements 60H, and the thrust resisting surfaces 56H and 58H on the tubular member 74H. Similar reference numerals indicate similar parts insofar as identity of the actuators 10E and 10H are concerned. However, in the embodiment 10H, roller elements 60H are preferably in spaced relation, again without any spacing device or retainer being provided, as the spacing desired is achieved by the cooperation between the ridges or flanges 70E, the threading 72E, and the cooperation between surfaces 133H and 135H and 56H and 58H. Also, flanges 70E extend short of raceway surface 220 whereby raceway 52H operates in the manner comparable to raceway 52G. In both the actuator 10E and 10H, tubular member 74E is suitably journaled against movement axially of the shaft 28E, it being the shaft 28E that is movable linearly in accordance with these embodiments of the invention.

In the actuator 10I, motor housing 211 has gear reducer 137 built into same, which is only diagrammatically illustrated as it may be of any suitable type. Gear reducer 137 suitably couples shaft 281 to shaft segment 138 for appropriate gear reducing functions. Gear segment 138 is suitably journaled in conventional ball bearing unit 141 appropriately mounted in bearing plate 330 suitably secured to housing 211 by suitable lock ring 332.

Shaft section 138 is operably associated with a bearing unit 32G that is the same as that of actuator 10G, as indicated by corresponding reference numerals. The roller elements 60G of bearing unit 32G are operably associated with the tubular member 74I having threading 72G formed therein, which member 74I overlies housing 211 at one end 334 thereof, and at the other end 336 thereof is fixed to end wall 338 that is made fast in any suitable manner to a rod member 340 that is suitably connected to the implement to be operated by the actuator 10I. In the form shown, motor housing 20I and tubular member 74I are enclosed in a main housing structure 342 of any suitable type, defining an end wall 344 having an opening 346 through which rod 340 extends. Actuator 10I is arranged in a commercial form to serve as a valve actuator unit, with the rod 340 being suitably connected to the valve element to be moved.

It will thus be seen that in accordance with this invention, the basic linear actuator device comprises a shaft member and a tubular member in concentric relation thereto, with one of these members being threaded for meshing engagement with a plurality of roller elements encircling the shaft member and provided with right flanges or ridges in meshing engagement with the threading. The member that is not threaded is provided with a raceway surface on which the rollers are supported and the roller elements are restrained for movement axially thereof by suitable thrust resisting means acting on the roller element shanks, either adjacent their midportions (FIGS. 1 – 8, and 11 – 13), or at their ends (FIGS. 9 and 10 and 14–17). Either principal member may be the driven member or the driving member and either principal member may be the threaded member.

The roller elements are not journaled at their ends, but are free rolling for radial biasing in handling radial loads. Radial loads are resisted by the roller elements by their flanges riding on a raceway (FIGS. 9 and 10) or by their shanks riding on ball bearings (FIGS. 1 – 8) or on raceways (FIGS. 11–17). Thrust loads are resisted by the roller elements at their shanks by relatively broad surfaces either at their ends (FIGS. 9 and 10 and 14–17) or adjacent their midportions (FIGS. 1 – 8 and 11 – 13). The result is that the drive through the bearing unit of this invention is through efficiently applied friction generated by resistance, whereby as load increases, the friction type purchase that is provided increases to drive the load. Thus, load limitations inherent in flanged drive transmitting rollers journaled at their ends, and in transmission of thrusts across the rollers by application of same only to the flanges of the rollers are avoided, whereby the applicant is above to take full advantage of the force conversion factors available in his device.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A linear actuator comprising:
    a shaft member,
    a tubular member in substantial concentric telescoping relation to said shaft member,
    one of said members being threaded,
    a bearing unit interposed between said members,
    and means for rotating one of said members,
    said unit comprising:
    means for defining a raceway about said shaft member,
    a plurality of free rolling roller elements rolling about said raceway on actuation of said rotating means,
    said elements each including an elongate shank having right ridge means in lateral load transmitting rolling meshing engagement with said threading,
    with said element shanks each defining oppositely extending end portions forming the longitudinal ends of the respective roller elements, with said element ends being aligned transversely of said members,
    said roller element ends being free of journaling relative to said members,
    means for maintaining said ridge means of said elements in said meshing engagement with said threading,
    and means keyed to the member that is other than said threaded member for restraining said elements from movement longitudinally of said members against lateral loads and engaging the shanks thereof to the exclusion of said ridge means thereof.

2. The actuator set forth in claim 1 wherein:
    said right ridge means of each rolling element comprises a plurality of spaced right flanges in meshing relation with said threading,
    with the flanges of adjacent elements being scheduled longitudinally thereof to complement the pitch of said threading.

3. The actuator set forth in claim 2 wherein said restraining means comprises:
    grooves formed in said elements intermediate the ends thereof and aligned transversely of said members,
    and a plurality of rolling bearings interposed between said rolling elements and said raceway, with said bearings engaging the respective elements at their respective grooves,
    said raceway defining an annular bearing groove in which said bearings ride to form said maintaining means.

4. In a linear actuator of the type including a shaft member, a tubular member in substantial concentric telescoping relation to said shaft member, a bearing unit interposed between said members, and means for rotating one of said members, the improvement wherein:
    one of said members is threaded longitudinally thereof,
    and wherein said unit comprises:

means for defining a raceway about said shaft member, a plurality of free rolling roller elements of substantially equal lengths rolling about said raceway on actuation of said rotating means, said elements each including an elongate shank having right ridge means comprising a plurality of right flanges in rolling meshing engagement with said threading, with said elements shanks each defining oppositely extending end portions forming the longitidual ends of the respective roller elements, with said element ends being aligned transversely of said members, said roller element ends being free of journaling relative to said members, means for maintaining said ridge means of said elements in said meshing engagement with said threading, and means keyed to the member that is other than said threaded member for restraining said elements from movement longitudinally of said members against lateral loads and engaging the shanks thereof to the exclusion of said flanges.

5. The improvement set forth in claim 4 wherein:

said means for defining a raceway about said shaft member comprises a ball element carried by said shaft member and defining a spherically contoured peripheral surface, said roller elements each defining an encircling groove portion thereabout intermediate the ends thereof, said said roller element groove portions of the respective roller elements riding on said ball element surface to provide said restraining means.

6. The improvement set forth in claim 5 wherein:

said tubular member comprises said one member, the threading of said one member is 45° angle threading, said right ridge means of each of said roller elements comprising a flange adjacent either end of same in meshing engagement with said threading, said flanges of each roller element being spaced apart at least a distance equivalent to the pitch diameter of said threading.

7. The improvemet set forth in claim 4 wherein:

said restraining means comprises a pair of spaced apart oppositely acting thrust resisting surfaces adjacent either end of said raceway defining means and encircling said shaft member, said roller element shanks each defining adjacent either end of said bearing surfaces riding on the respective thrust resisting surfaces of said raceway, said right ridge means of each rolling element being intermediate said ends thereof.

8. The improvement set forth in claim 7 wherein:

said threading is 45° angle threading, and said flanges are formed to substantially complement said threading.

9. A bearing unit for application between concentrically arranged shaft and tubular members, one of which is threaded, for moving one of said members linearly when the other member is rotated, said unit comprising:

means for defining a raceway about said shaft member, a plurality of free rolling elements rolling about said raceway on actuation of the member to be rotated, said elements each including an elongate shank having right ridge means for rolling meshing engagement with said threading, means for maintaining said ridge means of said elements in meshing engagement with said threading, and means for restraining said elements from movement longitudinally of said members against lateral loads and engaging the shanks thereof.

10. The bearing unit set forth in claim 9 wherein:

said right ridge means of each rolling element comprises a plurality of spaced flanges in meshing relation with the threading, with the flute flanges of adjacent elements being staggered longitudinally thereof to complement the pitch of said threading.

11. The bearing unit set forth in claim 9 wherein said restraining means comprises:

grooves formed in said elements intermediate the ends thereof and aligned tranversely of said members, and a plurality of rolling bearings interposed between said rolling elements and said raceway, with said bearings engaging the respective elements at their respective grooves, said raceway defining an annular bearing groove in which said bearings ride to form said maintaining means.

12. The bearing unit set forth in claim 9 wherein said restraining means comprises:

said raceway being formed to define opposed radially extending bearing surfaces extending crosswise of said members against which said elements engage at either end thereof, and a cylindrical surface on which said element ridge means ride and comprising said maintaining means.

13. The bearing unit set forth in claim 9 wherein:

said means for defining a raceway about the shaft member comprises a ball element carried by said shaft member and defining a spherically contoured peripheral surface, said roller elements each defining an encircling groove portion thereabout intermediate the ends thereof, with said roller element groove portions of the respective roller elements riding on said ball element surface to provide said restraining means.

14. The bearing unit set forth in claim 13 wherein:

the tubular member comprises the threaded member, said right ridge means of each of said roller elements comprising a flange adjacent either end of same in meshing engagement with said threading, said flanges of each roller element being spaced apart at least a distance equivalent to the pitch diameter of said threading.

15. A bearing unit for application between a shaft member and an internally threaded tubular member received over the shaft member for driving one of said members linearly when the other is rotated, said unit comprising:

an inner race adapted to be received over the shaft and defining a raceway, a plurality of bearing balls received in said raceway about said inner race, a plurality of bearing rollers riding on said bearing balls with each roller engaging an adjacent pair of said balls and extending generally longitudinally of the axis of said race, said rollers each being circumferentially grooved intermediate the ends thereof and engaging said balls at said grooves, said rollers each being formed with radial flanges on either side of said grooves that are shaped for meshing relation with the tubular member threading, and a retainer ring received about said rollers and in said roller grooves.

16. The bearing unit set forth in claim 15 wherein:

said roller radial flanges are at right angles to the axes of the respective rollers.

17. In a linear actuator of the type including a shaft member, a tubular member is substantial concentric telescoping relation to said shaft member, a bearing unit interposed between said members, and means for rotating one of said members, the improvement wherein:

one of said members is threaded longitudinally thereof, and wherein said unit comprises:

means for defining a raceway about said shaft member, a plurality of free rolling elements rolling about said raceway on actuation of said rotating means, said elements each including an elongate shank having right ridge means for rolling meshing engagement with said threading, means for maintaining said ridge means of said elements in meshing engagement with said threading, and means for restraining said elements from movement longitudinally of said members against lateral loads and engaging the shanks thereof, said raceway defining means comprising said shaft member being formed to define an annular groove thereabout having a thrust resisting surface adjacent either end of and encircling same, said roller element shanks each defining adjacent either end of same bearing surfaces riding on the resepctive thrust resisting surfaces of said raceway to provide said restraining means, said right ridge means of each rolling element comprising a plurality of spaced flanges in meshing relation with said threading intermediate said ends thereof.

18. The improvement set forth in claim 17 wherein:

said tubular member comprises said one member, the threading of said one member is 45° angle threading, said roller elements having sufficient length axially of said shaft member such that for each roller element diagonal lines between the portions of the bearing surfaces thereof engaging the respective thrust resisting surfaces and extending through like points on the opposite sides of the respective roller elements at opposite ends thereof intersect adjacent the axial midportion of the respective rollers at 90° angles and intersect at 45° angles with the generatrix of a right cylinder formed along the pitch diameter of said threading.

19. The improvement set forth in claim 18 wherein:

said raceway defining means comprises the shaft member being formed to define an annular groove thereabout having a thrust resisting surface adjacent either end of and encircling same, said roller element shanks each defining adjacent either end of same bearing surfaces riding on the respective thrust resisting surfaces of said raceway to provide said restraining means, said right ridge means of each rolling element comprising a plurality of spaced flutes in meshing relation with said threading intermediate said ends thereof.

20. The improvement set forth in claim 19 wherein:

the tubular member comprises said one member, the threading of said one member is 45° angle threading, said roller elements having sufficient length axially of the shaft member such that for each roller element diagonal lines between the portions of the bearing surfaces thereof engaging the respective thrust resisting surfaces and extending through like points on the opposite sides of the respective roller elements at opposite ends thereof intersect adjacent the axial midportion of the respective rollers at 90° angles and intersect at 45° angles with the generatrix of a right cylinder formed along the pitch diameter of said threading.

* * * * *